(12) United States Patent
Lepaksha et al.

(10) Patent No.: US 12,536,112 B2
(45) Date of Patent: Jan. 27, 2026

(54) THERMAL MITIGATION FOR SoC USING MEMORY ACCESS LATENCY

(71) Applicant: QUALCOMM Incorporated, San Diego, CA (US)

(72) Inventors: Hithesh Hassan Lepaksha, Hyderabad (IN); Sharath Kumar Nagilla, Hyderabad (IN); Kalangi Fredy Sundar, Hyderabad (IN); Raveesh Sinha, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 228 days.

(21) Appl. No.: 18/473,948

(22) Filed: Sep. 25, 2023

(65) Prior Publication Data

US 2025/0103522 A1 Mar. 27, 2025

(51) Int. Cl.
*G06F 13/16* (2006.01)
*G06F 11/30* (2006.01)
*G06F 13/42* (2006.01)

(52) U.S. Cl.
CPC ...... *G06F 13/1689* (2013.01); *G06F 11/3058* (2013.01); *G06F 13/4234* (2013.01)

(58) Field of Classification Search
CPC ............ G06F 13/1689; G06F 11/3058; G06F 13/4234; G06F 1/324; G06F 1/3275; G06F 13/1668; G06F 1/206
See application file for complete search history.

(56) References Cited

U.S. PATENT DOCUMENTS

| 2007/0124103 | A1  | 5/2007  | Aguilar et al. |            |
|--------------|-----|---------|----------------|------------|
| 2014/0325122 | A1* | 10/2014 | Kim            | G06F 1/206 |
|              |     |         |                | 711/103    |
| 2018/0046231 | A1* | 2/2018  | Raghu          | G06F 1/3275 |
| 2019/0064893 | A1* | 2/2019  | Kumar          | G06F 9/4893 |

FOREIGN PATENT DOCUMENTS

JP 2004082435 A 3/2004

OTHER PUBLICATIONS

International Search Report and Written Opinion—PCT/US2024/040040—ISA/EPO—Nov. 27, 2024.

* cited by examiner

*Primary Examiner* — Francisco A Grullon
(74) *Attorney, Agent, or Firm* — Loza & Loza, LLP

(57) ABSTRACT

Aspects relate to using memory access latency to mitigate thermal excesses in a System on a Chip (SOC). An apparatus includes a processing core, a memory, and thermal monitor configured to determine a thermal state of the processing core. A memory controller is coupled to the processing core, to the thermal monitor, and to the memory, and configured to provide the processing core with access to the memory, the memory controller further configured to delay access to the memory in response to the thermal state.

20 Claims, 5 Drawing Sheets

| Index | Target Add. | Op. Code | Status | Length | Payload |
|---|---|---|---|---|---|
| 0x0 | 0xc10000000 | Read/Write | REQ | 0x1f | Data |

| Index | Target Add. | Op. Code | Status | Length | Payload |
|---|---|---|---|---|---|
| 0x1 | 0xc10000000 | NOP | REQ | 0x1f | Dummy Bits |

| Temp Threshold | Command | Wait States |
|---|---|---|
| 105 | (DCVS) ON 11 | 4 |
| 90 | ON 11 | 4 |
| 75 | ON 10 | 2 |
| 70 | ON 01 | 1 |
| < 70 | OFF 00 | 0 |

THERMAL MITIGATION FOR SoC USING MEMORY ACCESS LATENCY

TECHNICAL FIELD

Aspects of the present disclosure relate generally to thermal mitigation for integrated circuits, e.g., a system-on-a-chip (SoC), and, in particular, to thermal mitigation by affecting latency in memory accesses.

BACKGROUND

The amount of heat generated by a semiconductor, e.g., a processor, sensor, or memory, is directly proportional to the switching activity and the density of the switches on the semiconductor. The switching activity refers to how frequently the switches, e.g., transistors and diodes, change state. The density of the switches refers to how many switches are active for a particular unit of area of the semiconductor. The switching activity is related to the clock frequency applied to the switches and the duty cycle of the switches. High performance semiconductors operate at higher clock frequencies with more transistors per die. This makes a die more likely to overheat. Compact and portable form factors make it more difficult to provide cooling for a high-performance die. In some cases, the speed of operation is constrained to ensure that the die does not overheat.

The switching activity is affected by the number of switches that are active at the same time and by the switching frequency of the integrated circuit. Thermal mitigation often includes putting parts of an integrated circuit into idle or sleep states and reducing the frequency of the input clock that drives the switches. These thermal mitigation measures also reduce the performance of the integrated circuit.

A SoC may include multiple components including integrated circuits, e.g., sensors, modems, processors, memory, and output circuits. The SoC may often have a safeguard to shut down operation when any one part of the SoC becomes overheated. For critical or high reliability applications, the components of the SOC are operated at lower power and lower frequency in order to prevent overheating and avoid shutting down. The lower power and frequency also increase the longevity of the integrated circuits of the SoC.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

An apparatus includes a processing core, a memory, a thermal monitor configured to determine a thermal state of the processing core, and a memory controller coupled to the processing core and to the memory and configured to provide the processing core with access to the memory, the memory controller further configured to delay access to the memory in response to the thermal state.

In another example, a method includes determining a thermal state of a processing core, and delaying access by the processing core to a memory coupled to the processing core through the memory controller in response to the thermal state.

In another example, a non-transitory computer-readable medium has instructions stored therein for causing a processor to perform the operations of the method above.

In another example, an apparatus includes means for determining a thermal state of a processing core, and means for delaying access by the processing core to a memory coupled to the processing core through the memory controller in response to the thermal state.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

As described herein thermal mitigation may be applied to a processor by delaying access to a memory in response to a thermal state from a thermal monitor. One or more thermal sensors detect temperatures of one or more processing cores. A thermal monitor coupled to the thermal sensor determines a thermal state of the processing cores and then a memory controller delays access to the memory in response to the thermal state. The forced memory access delay reduces the effective switching frequency of the processing cores reducing the heat generated by the processing cores.

For example, when a processor uses a memory, such as a cache or other local volatile memory, various instructions of the processor may depend upon a read or a write operation to the memory. When an instruction requires a value or even an instruction from memory, the instruction cannot be executed until after the value has been fetched from the memory. For other instructions, a read operation must be completed into the memory before proceeding to ensure that the latest values are stored for use by other instructions. As a result, a slow memory forces the processor to wait for the memory. The wait reduces the heat generated by the processor.

Figure 1:
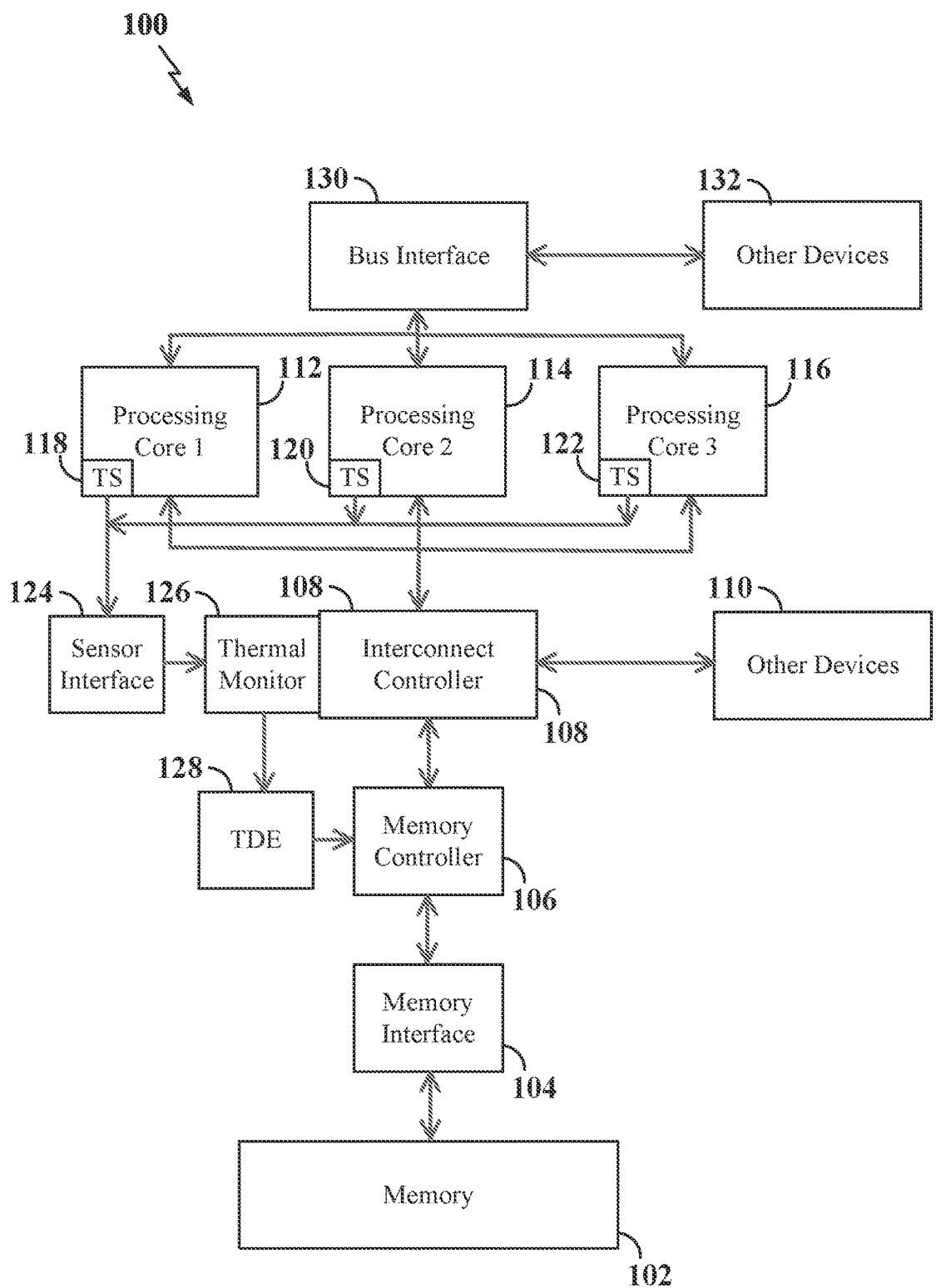
FIG. 1 illustrates a diagram of thermal mitigation using a thermal monitor and memory controller, in accordance with aspects of the disclosure.

FIG. 1 is a diagram of portions of a computing system 100 with a thermal monitor 126. The computing system is presented with a particular SoC architecture, but any other computing system architecture may be used as may be suited to embedded systems, portable systems, Internet of Things systems, desktops systems, server systems, or storage systems, inter alia. The SoC may have many more components than are shown. The SoC may be formed as one or more dies coupled together by a package substrate or in any other suitable way. While the present description is presented in the context of an SoC, the techniques and processes described herein may be applied to a system with multiple discrete components that are separately packaged, powered and housed.

Heat is generated by switching activity in processing cores 112, 114, 116 of the system. While the present description is directed primarily to the processing cores 112, 114, 116, similar structures and techniques will also address excess heat in memory devices, external interfaces, and other components of the system 100. The processing core heat is determined, at least in part, by the operating voltage and the switching frequency of the switches, e.g., transistors, in the processing cores 112, 114, 116. Additional heat is generated by resistive, capacitive, and inductive elements but this heat also varies approximately with the voltage and switching frequency.

A memory transaction latency is added to a memory controller 106 by a tunable delay element 128. The added memory transaction latency acts as a thermal mitigation mechanism that does not require any change in the voltage or switching frequency. As shown, a memory 102 is coupled to a memory interface 104, e.g., a physical memory interface, which is coupled to a memory controller 106. The memory controller 106 is shown coupled to an interconnect controller 108. The interconnect controller 108 is shown coupled to the processing cores 112, 114, 116 and may also be coupled to other components (not shown). The interconnect controller 108 is configured to allow the processing cores 112, 114, 116 and other components to access the memory 102 through the memory controller 106. The memory controller 106 drives read and write transactions, as well as diagnostic and maintenance transaction to the memory 102 through the memory interface 104.

The present description is presented in the context of dynamic random-access memory (DRAM). In some aspects, DRAM is easy to control outside of a processing core because of the nature of the protocol and the memory interface 104. Many computing systems put large blocks of instructions and intermediate values in DRAM, e.g., Double Data Rate Synchronous Dynamic Random-Access Memory (DDR SDRAM). Accordingly, a delay in reading or writing to the DRAM can directly cause a delay to the processing core that issued the read or write instruction. The techniques and structures described herein may also be applied to other types of memory, instead of and/or in addition to DRAM, whether used for the same, a similar, or a different purpose. Such memory includes static random-access memory (SRAM), solid state disk memory (SSD), cache memory, mass memory, volatile memory, non-volatile memory, etc.

The interconnect controller 108 may also be coupled to other devices 110, including the various other types of memory mentioned above. A second bus interface 130 may also be coupled to the processing cores 112, 114, 116 to provide an interface to still other devices 132, such as communication interfaces, sensors, actuators, user interfaces, other memory, etc. In some examples, there may be multiple bus interfaces. In some examples, the interconnect controller may be the only interface. The illustrated components represent only a portion of the possible components of the computing system 100 and may represent only a subsystem or an entire SoC. The memory 102 may be on the same die as the memory interface 104 and the memory controller 106, e.g., as a memory subsystem. The memory 102 may be on the same die or a different die as the interconnect controller 108 and the processing cores 112, 114, 116.

In this example, the processing cores 112, 114, 116 of the computing system 100 share the memory 102 concurrently. There may be more or fewer processing cores and there may be other components that also share the memory 102 concurrently. The round-trip latency of the memory 102 through the interconnect controller 108 significantly affects the turnaround time for many of the tasks being executed in the processing cores 112, 114, 116. This dependency on the memory response time may be leveraged to regulate the switching activity of one or more of the processing cores 112, 114, 116. The switching activity is regulated in response to the temperature of one or more of the processing cores 112, 114, 116.

As shown, a first processing core 112 has a first thermal sensor 118. A second processing core 114 has a second thermal sensor 120 and a third processing core 116 has a third thermal sensor 122. The thermal sensors are representative of one or more thermal sensors in one or more positions of the respective processing core that are thermally coupled to one or more areas of the respective processing core to generate a thermal signal, e.g., a variable voltage, indicating a temperature of the respective processing core. The thermal signals from multiple sensors may be averaged or aggregated in any of a variety of different ways for each processing core. The thermal signals may be analog or digital to suit different implementations. In some examples, the thermal sensors 118, 120, 122 may be included in the processing cores 112, 114, 116 for other purposes and such existing current thermal sensors may also be used for the structures and techniques described here.

The thermal sensors 118, 120, 122 are coupled to a sensor interface 124 to receive the bare or aggregated thermal signals. The sensor interface 124 is coupled to a thermal monitor 126 that analyzes the thermal signals and determines a suitable delay. The thermal monitor 126 is coupled to a tunable delay element 128 that is coupled to the memory controller 106 to command a delay in response to the thermal monitor. In some examples, the thermal monitor 126 and the tunable delay element 128 may be incorporated into the interconnect controller 108 determine whether to delay access to the memory 102 by the memory controller 106.

In some examples, the thermal monitor 126 aggregates the highest temperature from the thermal sensors 118, 120, 122 and compares the aggregated highest temperature with stored thresholds to determine the highest thermal state of the processing cores 112, 114, 116. In some examples, the thermal monitor 126 averages the temperatures and compares the average with stored thresholds to determine a thermal state of the processing cores 112, 114, 116. Other techniques may also be used to determine the thermal state. In some examples, a thermal state is independently determined for each processing core and action is taken for each processing core independently. In some examples, the thermal state of each processing core is combined for an overall thermal state to be applied to all of the processing cores 112, 114, 116 together.

Once the thermal state of the processing cores 112, 114, 116 is determined by the thermal monitor 126, e.g., by temperature threshold violations, a delay command may be generated and sent to the memory controller 106 through the tunable delay element (TDE) 128. The delay command may be a binary signal to alternately enable or disable delaying access to the memory 102. In some examples, the delay command has multiple levels to indicate the severity of the threshold violation to the tunable delay element 128. The TDE is coupled to the memory subsystem to control the response latency for read and write transactions by adding a delay to the read and write transactions. For a multiple level command, the TDE 128 may add more or less delay in response to which one of the multiple levels is in the command.

The added delay may be in the form of adding delay states or wait states to transactions between the memory controller 106 and the memory 102. In some examples, the delay may be added by adding other instructions to the memory controller other than read and write transactions. In some examples, the delay is added by adding instructions with no operations to the memory bus between the memory interface 104 and the memory 102, e.g., no operand, NOP, or other inactive instructions.

The delay prevents the respective processing core from acting on the value from or to the memory for the duration of the delay. This allows the switching frequency to be significantly reduced for the part of the processing core that is driving the memory access. By reducing the switching frequency, the temperature of the affected part of the processing core is reduced. The magnitude or duration of the delay may be controlled by the thermal monitor 126 such that the reduced switching activity regulates the temperature of the system 100. Since the more active parts of the processing core are more likely to be accessing the memory more frequently, delaying access to the memory tends to most affect the most active parts of the processing core. This causes the reduced temperature to be greatest where it is most needed. The temperature regulation may be performed by the thermal monitor without affecting the clocking frequencies to the cores and without affecting the supply voltages to the computing system.

As described herein, memory read and write latencies are modified in response to temperature even as the clocking frequency and voltage do not change. The thermal monitor provides thermal mitigation using a system memory transaction latency.

In the example of FIG. 1, a memory subsystem is shown that includes the memory 102 with registers for storing data, the memory interface 104 to physically connect to addressed registers, and the memory controller 106 to drive all transactions through the memory interface. The techniques and structures described herein may be adapted to other memory configurations with different components connected to the interconnect controller 108. In some configurations, the memory controller 106 and memory interface 104 may be absent or incorporated into the memory 102 or implemented by the interconnect controller 108. The TDE 128 may be adapted to accommodate other memory configurations and may be incorporated into the thermal monitor 126 or adapted to act on the interconnect controller 108 instead of on a memory controller. The TDE 128 and the thermal monitor 126 may be implemented as state machines that are discrete or a part of another system, e.g., the interconnect controller 108.

Figure 2:
FIG. 2 illustrates a memory operation command packet structure and a threshold table, in accordance with aspects of the disclosure.
Figure 2:
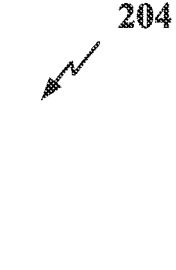

FIG. 2 illustrates a memory transaction command, a NOP command, and a delay threshold table. In some implementations, a memory transaction from the memory controller has a packet configuration with a structure as shown in Table 202 of FIG. 2. The table has a header row 212 for illustration purposes and a data row 214. A memory transaction packet does not require a header row. The values of the data row 214 are shown as examples of the structure and not actual values. The payload is the data to be written into the memory at the target address and has a length as provided in the length field. The memory transaction packet of this example has the status of being a request and an operation code of read or write.

Table 204 is an example of a delay command. The thermal state is an example of indicating different thermal states from the thermal monitor to the memory controller. The delay command may have a similar structure to that of Table 202 with the same header row 216 for illustration purposes and with changes to the data row 218 for some or all of the fields. The target address is irrelevant but the Op. Code is no operation (NOP) and the payload is blank or dummy bits. The length may be matched to the payload or a default value.

Table 206 is a threshold table that may be used by the thermal monitor to determine the thermal state of the processing cores. The header row 222 indicates different temperature thresholds in the left column as example thresholds. While the thresholds are indicated as temperatures, this may be adapted to the output of the sensor interface and may be a voltage, or any analog or multi-bit value that indicates a temperature but is not an actual temperature. When the temperature is below a first lowest threshold, e.g., 70° C., then the thermal monitor does not act to delay access to the memory. This may be indicated by a no delay command, e.g., OFF or 00, or by no action and no command, or in any other suitable way.

When the temperature exceeds the first threshold, e.g., 70° C., then the thermal monitor may enable the thermal mitigation at a first level by delaying access in response to the delay command. The command is indicated as an ON or 01, but may be any suitable command or operation. In some examples, the thermal monitor has two levels ON and OFF. If the temperature continues to rise and exceeds another threshold, then a different thermal mitigation may be applied or the system may be shut down to prevent damage. In FIG. 2, the Table 206 shows that when the temperature exceeds a fourth threshold, e.g., 105° C., then a Dynamic Clock and Voltage Scaling (DCVS) system may be activated. The DCVS system may be independent of the thermal monitor and operate with no relationship or connection to the TDE. In the table 206, this is indicated by the same command, e.g., 11, for exceeding the third threshold, e.g., 90° C., and the fourth threshold, e.g., 105° C.

For a two-bit command structure from the thermal monitor to the TDE, two more thresholds may be accommodated. Exceeding a second threshold, indicated as 75° C., results in a second level delay command, e.g., 10. Exceeding a third threshold, indicated as 90° C., results in a third level delay command, e.g., 11. Each delay command causes wait states to be added to memory commands and each additional level causes additional wait states. The first level causes one wait state to be added. This may be performed by adding a NOP command as in Table 204 or in any other suitable way. The second level causes two wait states to be added to each memory transaction and the third level causes four wait states to be added. The number of wait states and the implementation of the delay, whether by wait states, dummy commands, or another type of delay may be adapted to suit different computing system and memory structures. While a two-bit command is shown, there may be more bits and thresholds. The structure of the command may be adapted to a suitable protocol, e.g., as a packet with additional information or with hardware lines with pins or traces.

By selection of the thresholds in the threshold table, the thermal mitigation may be configured as an additional layer to reduce the need to use a DCVS or similar system. In addition, the thermal mitigation may be used when there is no DCVS system and does not need to rely on a DCVS system for any part of its operation. By implementing the thermal mitigation before enabling DCVS, the need to enable the DCVS is reduced. In an example, the DCVS system reduces a voltage applied to the processing core in response to a first thermal state. The memory controller delays access to the memory in response to a second thermal state. The second thermal state corresponds to a lesser temperature, e.g., 125° C., than the first thermal state, e.g., 130° C.

As examples, in some systems, operation is permitted to particular temperature, e.g., 125° C. without any thermal mitigation. As the temperature crosses, e.g., 125° C., software shutdown is triggered and at, e.g., 130° C., hardware shutdown is initiated. An abrupt shutdown can cause negative consequences and may be avoided by applying memory access delay as a thermal mitigation. Advanced Driver Assistance Systems (ADAS) have been proposed with such software and hardware shutdown and no DCVS. For In-Vehicle Infotainment (IVI) systems that include a DCVS system, software mitigation is triggered at lower temperatures using DCVS and disabling certain operations. After e.g., 125° C., the system functionality will be very limited. Thermal mitigation by delaying memory access may allow some of the disablement to be avoided.

Figure 3:
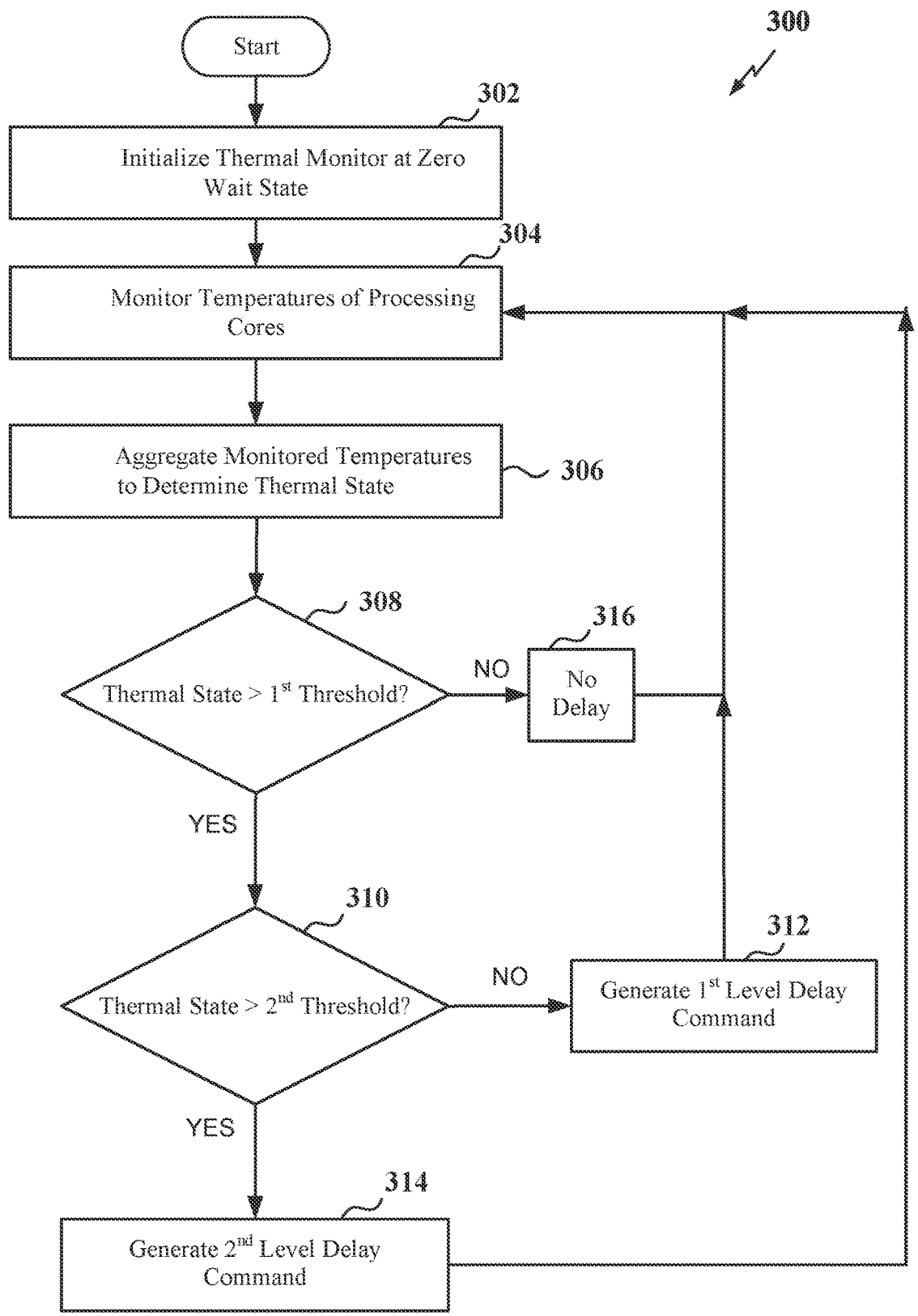
FIG. 3 illustrates a flow diagram of operating a thermal monitor for thermal mitigation in a computing system, in accordance with aspects of the disclosure.

FIG. 3 is a process flow diagram 300 of operating a thermal monitor for thermal mitigation in a computing system. The process begins as the computing system starts. At 302, the system is initialized and operating normally such that access to the memory by the memory controller is not delayed. The thermal monitor monitors temperatures of the processing cores at 304. The temperatures are received as thermal signals from a sensor interface or in another way. At 306, the thermal monitor aggregates the monitored temperatures to determine a thermal state for the processing cores. There may be an aggregated thermal state for all of the processing cores combined. In some examples, there is one thermal state for each processing cores in which case the process of FIG. 3 is performed for each core. The thermal state may be a temperature as shown in the table 206 or it may be in another form. The thermal state indicates an aggregated temperature for all of the thermally coupled thermal sensors and may not indicate an actual physical temperature of a processing core at any specific location.

At 308, the thermal state of 306 is compared to a first threshold. If the thermal state does not exceed the first threshold, then the process returns to monitoring temperatures at 304. The thermal monitor selects a delay amount of zero or no delay. No thermal mitigation is applied, access to the memory is not delayed and any previously added delay is removed at 316. If the thermal state exceeds the first threshold, then at 310, the thermal state is compared to the second threshold. If the second threshold is not exceeded, then a first level delay command is generated at 312 based on the thermal state being between the first and second thresholds. The thermal monitor selects a first delay amount. This is indicated in the table 206 as a delay amount of "1." In a system with only one threshold, then the test at 310 is not performed, and the first level delay command is generated at 312. In either case, the process returns to 304 to monitor the temperatures. This will cause the access delay to be removed when the thermal state falls below the first threshold.

If the thermal state exceeds the second threshold at 310, then a second level delay command is generated at 314 and the process returns to monitor temperatures at 304. The thermal monitor selects a second delay amount. In the table 206, this is indicated as a delay amount of "2." The table 206 shows a third level threshold which may be added to the process flow diagram 300 as another test in the same manner as the second test 314. Additional thresholds may also be added to suit the particular computing system.

Figure 4:
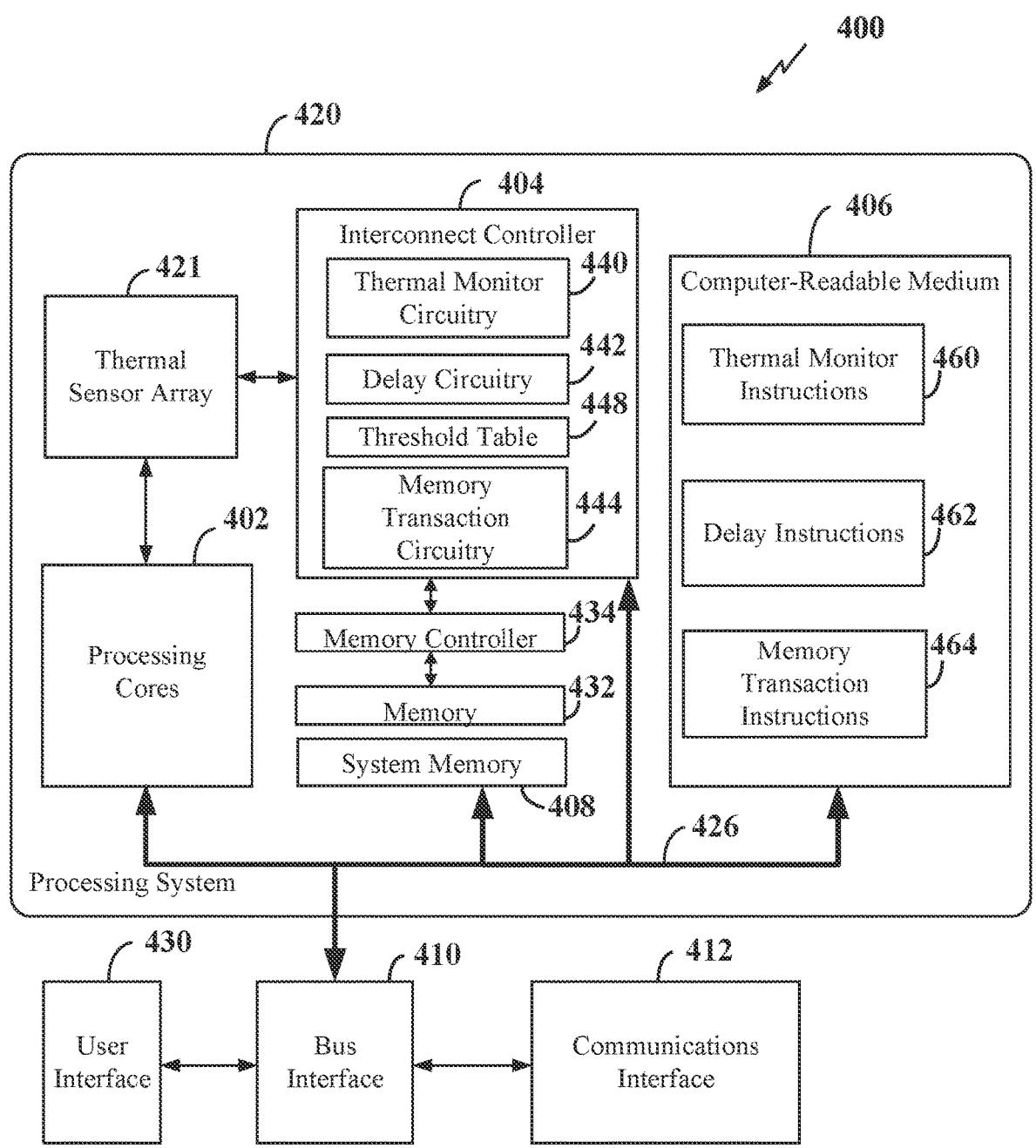
FIG. 4 illustrates a block diagram of an example hardware implementation for a device having thermal mitigation using a thermal monitor, in accordance with aspects of the disclosure.

FIG. 4 illustrates a block diagram of an example of a hardware implementation for a device 400, such as a user equipment, a portable device, a notebook computer, a tablet, a computer, a server, a router, a memory array, or any other suitable device with one or more integrated circuits with a processing core accessing a memory. In this example, the device includes a processing system 420 with one or more processing cores 402, as described above. In accordance with various aspects of the disclosure, an element, or any portion of an element, or any combination of elements may be implemented with the processing system 420. Examples of processing cores 402 include microprocessors, microcontrollers, digital signal processors (DSPs), field programmable gate arrays (FPGAs), programmable logic devices (PLDs), state machines, gated logic, discrete hardware circuits, and other suitable hardware configured to access a shared memory through an interconnect controller. In various examples, the device 400 may be configured to perform any one or more of the functions described herein.

In this example, the processing system 420 may be implemented with a bus architecture, represented generally by the bus 426. The bus 426 may include any number of interconnecting buses and bridges depending on the specific application of the processing system 420 and the overall design constraints. The bus 426 communicatively couples together various circuits including a thermal sensor array 421 thermally coupled to the processing cores 402, one or more system memories (represented generally by the system memory 408), an interconnect controller 404, memory 432, and computer-readable media (represented generally by the computer-readable medium 406) having instructions stored thereon.

The bus 426 may also link various other circuits such as timing sources, peripherals, voltage regulators, and power management circuits, which are well known in the art, and therefore, will not be described any further. A bus interface 410 provides an interface between the bus 426 and a communication interface 412. The communication interface 412 provides a means for communicating through, for example, a wireless or wireline connection with various other apparatuses over a wireless or wireline transmission medium. In some examples, a wireless device may include two or more interfaces, each configured to communicate through the same or different media. The communication interface 412 provides a communication interface or means of communicating with various other apparatuses and devices (for example, other devices housed within the same apparatus or other external apparatus) over an internal bus or external transmission medium, such as an Ethernet cable, USB cable, Wi-Fi, Bluetooth, Near-Field Connection, and other connectors The bus interface 410 also provides an interface between the bus 426 and a user interface 430. Depending upon the nature of the apparatus, the user interface 430 may include a local or remote interface (for example, keypad, display, speaker, microphone, joystick). Of course, such a user interface is optional, and may be omitted in some examples, such as an Internet of Things device.

The processing cores 402 are responsible for performing the functions of the device 400. The configuration and use for the processing cores 402 depend on the purpose and functions of the device. There may be more or fewer cores. In addition to general purpose cores, one or more of the cores may be specialized for particular functions, e.g., image processing, graphics rendering, audio recording, transcoding, and rendering, communications processing including encoding and decoding, position and motion determination, digital signal processing, artificial intelligence, etc. One or more of the cores may also be configured for system management, security, and other functions. The processing cores 402 use the memory 432 through the interconnect controller 404 and a memory controller 434 to support one or more of these functions in support of operating the device 400. The interconnect controller 404 is responsible for managing access to the memory 432 through the memory controller 434, which may be though the bus 426, including the execution of software stored on the computer-readable medium 406. The software, when executed by the interconnect controller 404, causes the interconnect controller 404 to perform the various functions described below for thermal mitigation. In this example, thermal monitor circuitry 440 is incorporated into the interconnect controller 404. In some examples, the thermal monitor is a discrete and separate unit. The computer-readable medium 406, the interconnect controller 404, and the memory 432 may also be used for storing data that is manipulated by the processing system 420 when executing software.

The interconnect controller 404 may be a part of one or more of the processing cores 402 and perform operations by means of a processor core executing software stored in the computer-readable medium 406. In other examples, the interconnect controller 404 may be independent of the processing cores 402 within the processing system 420 (as shown) to execute software stored on the computer-readable medium 406 using its own processing resources. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The interconnect controller 404 may be implemented in hardware, firmware, a state machine, or other device without need for the instructions in the computer-readable medium 406.

The computer-readable medium 406 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 420, external to the processing system 420, or distributed across multiple entities including the processing system 420. Those skilled in the art will recognize how best to implement the described functionality presented throughout this disclosure depending on the particular application and the overall design constraints imposed on the overall system.

The device 400 may be configured to perform any one or more of the operations described herein. In some aspects of the disclosure, the interconnect controller 404, as utilized in the device 400, may include circuitry configured for various functions.

The interconnect controller 404 is coupled to the system memory 408 through the bus 426. The system memory 408 may include parameters and configuration values, that may be initial settings, operating system settings, or application settings for configuring the threshold table 448 described above. The threshold table 448 used by the interconnect controller 404 may be in the interconnect controller 404, the computer-readable medium 406, the system memory 408, delay circuitry 442, compare logic (not shown) or another device.

The interconnect controller 404 may include thermal monitor circuitry 440 configured to determine a thermal state of the processing cores. The thermal monitor circuitry 440 may include one or more hardware components that provide the physical structure that performs various processes related to determining a thermal state of the processing cores. The thermal monitor circuitry 440 may include functionality for a means for determining a thermal state of the processing cores. The thermal monitor circuitry 440 may further be configured to execute thermal monitor instructions 460 included on the computer-readable medium 406 to implement the thermal monitor described herein.

The interconnect controller 404 may include delay circuitry 442, also referred to herein as compare logic, configured to generate a delay command by comparing the thermal state to the thresholds in the threshold table 448 as discussed herein. The delay circuitry may include functionality for a means to generate a delay command to indicate the thermal state in response to comparisons with thresholds in the threshold table 448 of the memory controller. The delay circuitry 442 may further be configured to execute delay instructions 462 included on the computer-readable medium 406 to implement one or more functions described herein.

The interconnect controller 404 may include memory transaction circuitry 444 configured to delay access to the memory in response to the delay command. The memory transaction circuitry 444 may include functionality, e.g., a means, for delaying access to the memory in response to the delay command. The memory transaction circuitry 444 may further be configured to execute memory transaction instructions 464 included on the computer-readable medium 406 to implement one or more functions described herein.

The circuit architecture described herein may be implemented on one or more ICs, analog ICs, RFICs, mixed-signal ICs, ASICs, printed circuit boards (PCBs), electronic devices, etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 5:
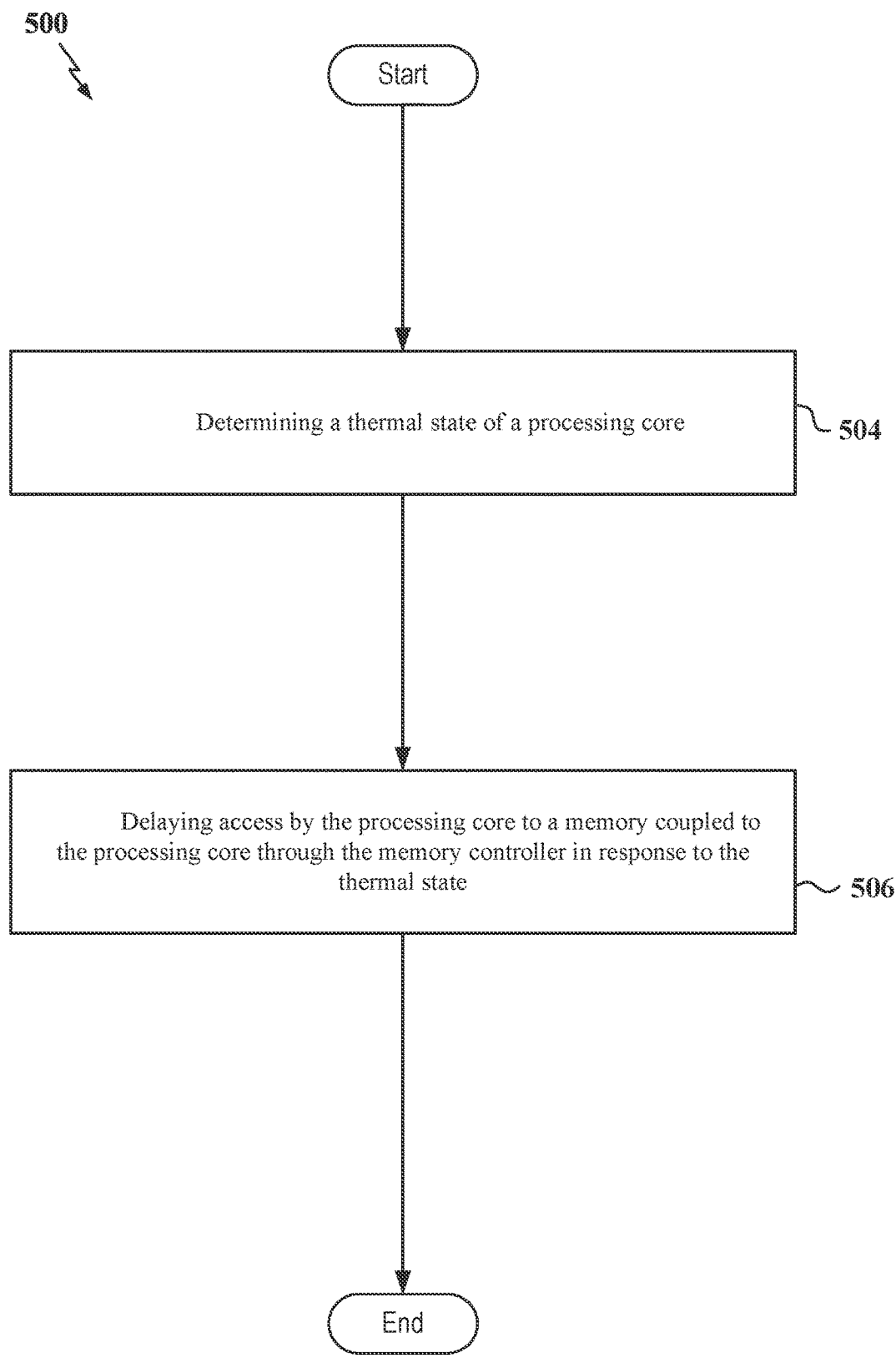
FIG. 5 illustrates a flow diagram of a method for thermal mitigation using a memory controller, in accordance with aspects of the disclosure.

FIG. 5 is a process flow diagram of delaying a memory access using a mapping table. After start, at block 502, the process includes determining a thermal state of a processing core. A thermal sensor may generate a thermal signal, e.g., a voltage, indicating a temperature of the processing core. The thermal sensor may be coupled to a thermal monitor that is configured to determine the thermal state. The thermal monitor may determine the thermal state by comparing the thermal signal to a threshold.

At block 504, the process includes delaying access by the processing core to a memory coupled to the processing core through the memory controller in response to the thermal state. In some aspects, the process includes the thermal monitor generating a delay command to the memory controller in response to the thermal state and the thermal monitor. In some aspects, a tunable delay element is coupled to the memory controller to delay access in response to the delay command, e.g., by adding instructions with no operations to the memory bus in response to the thermal state.

In one aspect, access is delayed by adding delay states to read and write transactions from the processing core. In one aspect access is delayed by adding instructions with no operations to the memory bus. Other means for delaying access may be used instead or in addition.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor and the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: An apparatus comprising: a processing core; a memory; a thermal monitor configured to determine a thermal state of the processing core; and a memory controller coupled to the processing core, to the thermal monitor, and to the memory, and configured to provide the processing core with access to the memory, the memory controller further configured to delay access to the memory in response to the thermal state.

Example 2: The apparatus of example 1, further comprising a memory interface between the processing core and the memory controller and wherein the thermal monitor is integrated with the memory interface.

Example 3: The apparatus of example 1 or 2, wherein the thermal monitor receives a thermal signal indicating a temperature of the processing core, wherein the thermal monitor compares the thermal signal to a threshold, and wherein the thermal monitor generates the delay command in response to the thermal signal exceeding the threshold.

Example 4: The apparatus of any one or more of the above examples, wherein the memory controller delays access by adding delay states to read and write transactions from the processing core.

Example 5: The apparatus of any one or more of the above examples, wherein the memory controller delays access by adding wait states to read and write transactions from the processing core.

Example 6: The apparatus of any one or more of the above examples, wherein the memory controller delays access by adding instructions other than read and write transactions from the processing core.

Example 7: The apparatus of any one or more of the above examples, further comprising a memory bus between the memory controller and the memory and wherein a tunable delay element coupled to the memory controller to add instructions with no operations to the memory bus in response to the thermal state.

Example 8: The apparatus of any one or more of the above examples, wherein the thermal monitor uses the thermal state to select one of a plurality of delay amounts.

Example 9: The apparatus of any one or more of the above examples, comprising: a second processing core coupled to the memory controller for access to the memory, wherein the thermal monitor determines a thermal state of the second processing core, and wherein the thermal controller delays access to the memory, in part, in response to averaging the thermal state of the first processing core and the thermal state of the second processing core.

Example 10: The apparatus of any one or more of the above examples, comprising: a second processing core coupled to the memory controller for access to the memory, wherein the thermal monitor determines a thermal state of the second processing core, and wherein the thermal controller delays access to the memory, in part, in response to aggregating the thermal state of the first processing core and the thermal state of the second processing core to determine a highest thermal state.

Example 11: The apparatus of any one or more of the above examples, wherein the memory is a random-access memory.

Example 12: The apparatus of any one or more of the above examples, further comprising a dynamic clock and voltage scaling system coupled to the processing core, wherein the dynamic clock and voltage scaling system reduces a voltage applied to the processing core in response to a first thermal state and wherein the memory controller delays access to the memory in response to a second thermal state, wherein the second thermal state corresponds to a lesser temperature than the first thermal state.

Example 13: The apparatus of any one or more of the above examples, comprising a thermal sensor thermally coupled to the processing core and configured to generate a thermal signal to the thermal monitor, wherein the thermal monitor is coupled to the thermal sensor to receive the thermal signal and to determine the thermal state in response to the thermal signal.

Example 14: The apparatus of example 13, wherein the thermal sensor provides a voltage to the thermal monitor, and wherein the thermal monitor determines the thermal state using the voltage.

Example 15: A method comprising: determining a thermal state of a processing core; and delaying access by the processing core to a memory coupled to the processing core through the memory controller in response to the thermal state.

Example 16: The method of example 15, comprising: receiving a thermal signal indicating a temperature of the processing core; and comparing the thermal signal to a threshold, wherein determining the thermal state comprises comparing the thermal signal to a threshold.

Example 17: The method of example 15 or 16, wherein delaying access comprises adding delay states to read and write transactions from the processing core.

Example 18: The method of any one or more of examples 15 to 17, wherein delaying access comprises adding instructions with no operations to the memory bus.

Example 19: An apparatus comprising: means for determining a thermal state of a processing core; and means for delaying access by the processing core to a memory coupled to the processing core through the memory controller in response to the thermal state.

Example 20: The apparatus of example 19, wherein the means for delaying access adds delay states to read and write transactions from the processing core . . . .

What is claimed is:

1. An apparatus comprising:
   a processing core;
   a memory;
   a thermal monitor configured to determine a thermal state of the processing core; and
   a memory controller coupled to the processing core, to the thermal monitor, and to the memory, and wherein the memory controller is configured to provide the processing core with access to the memory by driving read and write transactions to the memory, and wherein the memory controller is configured to receive the thermal state of the processing core from the thermal monitor and to delay access to the memory in the form of the read and write transactions in response to the thermal state of the processing core.

2. The apparatus of claim 1, further comprising a memory interface between the processing core and the memory controller and wherein the thermal monitor is integrated with the memory interface.

3. The apparatus of claim 1, wherein the thermal monitor receives a thermal signal indicating a temperature of the processing core, wherein the thermal monitor compares the thermal signal to a threshold, wherein the thermal monitor generates a delay command in response to the thermal signal exceeding the threshold, and wherein the memory controller is configured to delay access to the memory in response to the thermal state.

4. The apparatus of claim 1, wherein the memory controller delays access by adding delay states to read and write transactions from the processing core.

5. The apparatus of claim 1, wherein the memory controller delays access by adding wait states to read and write transactions from the processing core.

6. The apparatus of claim 1, wherein the memory controller delays access by adding instructions other than read and write transactions from the processing core.

7. The apparatus of claim 1, further comprising:
a memory bus between the memory controller and the memory; and
a tunable delay element coupled to the memory controller to add instructions with no operations to the memory bus in response to the thermal state.

8. The apparatus of claim 1, wherein the thermal monitor uses the thermal state to select one of a plurality of delay amounts.

9. The apparatus of claim 1, comprising:
a second processing core coupled to the memory controller for access to the memory,
wherein the thermal monitor determines a thermal state of the second processing core, and
wherein the thermal controller delays access to the memory, in part, in response to averaging the thermal state of the first processing core and the thermal state of the second processing core.

10. The apparatus of claim 1, comprising:
a second processing core coupled to the memory controller for access to the memory,
wherein the thermal monitor determines a thermal state of the second processing core, and
wherein the thermal controller delays access to the memory, in part, in response to aggregating the thermal state of the first processing core and the thermal state of the second processing core to determine a highest thermal state.

11. The apparatus of claim 1, wherein the memory is a random-access memory.

12. The apparatus of claim 1, further comprising a dynamic clock and voltage scaling system coupled to the processing core, wherein the dynamic clock and voltage scaling system reduces a voltage applied to the processing core in response to a first thermal state and wherein the memory controller delays access to the memory in response to a second thermal state, wherein the second thermal state corresponds to a lesser temperature than the first thermal state.

13. The apparatus of claim 1, comprising a thermal sensor thermally coupled to the processing core and configured to generate a thermal signal to the thermal monitor, wherein the thermal monitor is coupled to the thermal sensor to receive the thermal signal and to determine the thermal state in response to the thermal signal.

14. The apparatus of claim 13, wherein the thermal sensor provides a voltage to the thermal monitor, and wherein the thermal monitor determines the thermal state using the voltage.

15. A method comprising:
determining a thermal state of a processing core;
providing the processing core with access to a memory by a memory controller driving read and write transaction to the memory;
receiving the thermal state of the processing core at the memory controller; and
delaying access in the form of read and write transactions by the processing core to the memory through the memory controller in response to the thermal state of the processing core.

16. The method of claim 15, comprising:
receiving a thermal signal from a thermal sensor indicating a temperature of the processing core,
wherein determining the thermal state comprises comparing the thermal signal to a threshold.

17. The method of claim 15, wherein delaying access comprises adding delay states to read and write transactions from the processing core.

18. The method of claim 15, wherein delaying access comprises adding instructions with no operations to the memory bus.

19. An apparatus comprising:
means for determining a thermal state of a processing core;
means for providing the processing core with access to a memory by a memory controller driving read and write transaction to the memory;
means for receiving the thermal state of the processing core at the memory controller; and
means for delaying access in the form of read and write transactions by the processing core to the memory through the memory controller in response to the thermal state of the processing core.

20. The apparatus of claim 19, wherein the means for delaying access adds delay states to read and write transactions from the processing core.

* * * * *